Sept. 27, 1955  T. C. NOON ET AL  2,718,903
PILOT VALVE ASSEMBLY FOR A FUEL CONTROL UNIT
Filed Oct. 8, 1949

Inventors
T Cyril Noon
Walter R. Chapman

United States Patent Office 2,718,903
Patented Sept. 27, 1955

2,718,903

PILOT VALVE ASSEMBLY FOR A FUEL CONTROL UNIT

T Cyril Noon, Bainbridge Township, Geauga County, and Walter R. Chapman, Bedford, Ohio, assignors to Thompson Products, Inc., Cleveland, Ohio, a corporation of Ohio Application October 8, 1949, Serial No. 120,354

11 Claims. (Cl. 137—623)

The invention relates generally to a fuel control unit and more specifically to improvements on electronically actuated fuel control or fuel metering units adapted for installation in the fuel system of a turbo-jet engine whereby the fuel flow to the engine burners of a turbo-jet power plant may be simply and effectively controlled.

The subject matter of the present invention constitutes a continuation-in-part of that previously disclosed in our copending application entitled: Jet Engine Fuel Control System Responsive to Engine Speed and Tail Pipe Temperature, U. S. Serial No. 89,884, filed April 27, 1949.

As is fully described in the acknowledged copending application, one type of unitary fuel control unit for turbo-jet engine power plants has been heretofore provided in the form of a servo mechanism which, by use of a signal voltage proportional to engine speed and a signal voltage proportional to temperature, as well as various modifying controls, produces a resultant signal for controlling a proportional solenoid which, in turn, actuates a pilot valve in control of fuel flow through a hydraulic servo-operated throttle valve to the burners of a jet engine.

The throttle valve may be operatively associated with other components of the integral fuel control unit including such elements as a relief valve, a pressure regulator, and a speed-sensing unit.

According to the present invention, several significant improvements have been made to the fuel control unit, particularly with respect to the organization of the pilot valve assembly.

A further object of this invention is to provide a pilot valve structure having a unique arrangement of components tending to promote the reduction of differential expansion and contraction between the pilot valve elements.

Yet another object of this invention is to use fuel in a fuel control device to maintain uniform temperatures in all portions of the device.

Yet another object of the present invention is to provide a pilot valve structure whereby filtered fuel may be provided as a servo fluid in the operation of the pilot valve.

The pilot valve structure of the present invention is characterized by a pair of reversely turned loading springs positioned in such a manner as to decrease the distance between the pilot valve attachment to the springs and the metering lands of the valve, thereby reducing the effective length of the pilot valve and reducing the effects of differential expansion in the valve. The oppositely turned springs also preclude axial movement of the pilot valve in case of a slight twisting by the pilot valve stem.

The pilot valve of the present invention is further characterized by the provision of a clutch drive for the rotatable sleeve whereby damage due to binding is prevented. A filter is also provided whereby the fuel used as a servo fluid may be freed of all inclusions potentially capable of having a detrimental effect on the operation of the pilot valve.

The assembly of the pilot valve components follows a novel arrangement whereby all working parts may be surrounded by the fuel flowing therethrough so as to maintain the various elements at the same temperature thereby reducing the possibilities of the pilot valve repositioning as a result of differential expansion and contraction occurring between the various elements.

The present invention contemplates the provision of a potentiometer drive whereby damping of the flow control unit may be accomplished in response to fluid flow rather than by engine speed and altitude. In accomplishing this end, a variable resistor or potentiometer is shifted in response to throttle valve position by a mechanical linkage. The resistor in turn controls the magnitude of the signal to a proportioning solenoid which acts as the servomotor for the throttle valve.

Many other features and advantages as well as additional objects of the present invention will become manifest to those versed in the art upon making reference to the detailed description which follows and the annexed sheets of drawings in which a preferred embodiment of a fuel control device modified in accordance with the present invention is illustrated.

Figures 1, 2:
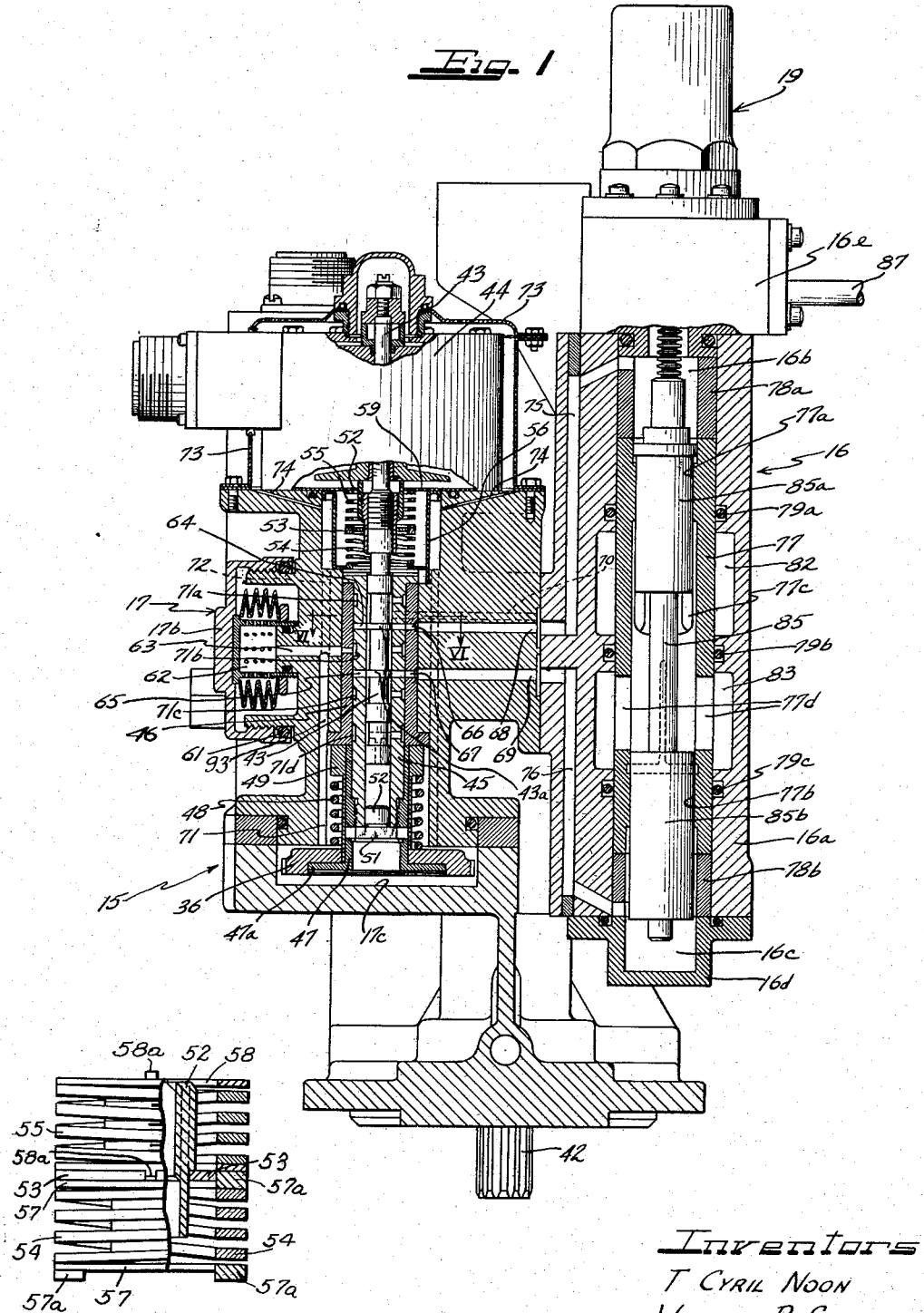
Figure 1 is a cross-sectional view with parts in elevation and with parts broken away illustrating additional details of construction of the pilot valve and the throttle valve.
Figure 2 is a fragmentary view of a spring assembly partly broken away and with parts in section employed in the pilot valve structure of the present invention.

It will be understood that the present invention finds a particularly useful application when employed in a fluid flow control system for a turbo-jet engine similar to that disclosed in my copending application, Serial No. 89,884, filed April 27, 1949. For complete details as to the structural provisions of such a system, reference may be had to the acknowledged application. By way of orientation, however, the operation of a control system may be briefly explained as follows.

The basic principle of a control system incorporating a fuel control device according to this invention is that it is, in general, a non-scheduling governor. By way of definitive explanation, it may be noted that with a full scheduling governor, engine speed is determined by a finite number of variables so that fuel flow, for example, may be scheduled against the variables to produce a desired speed value. A non-scheduling governor, as herein disclosed, exploits the concept of "derivative anticipation," which means that future values of speed and temperature are electronically determined by the preceding rate of change of such functions. It is isochronous during steady state running, and isothermal during accelerations. The electronic control is based on the use of a direct current signal voltage proportional to engine speed and a direct current signal voltage proportional to tail-pipe temperature. The signals are amplified, various derivatives, integrals, and related functions are required for stabilization and control are taken, and the resulting signal is sent to a proportional solenoid of a pilot valve in control of the fuel flow through a hydraulic servo-operated throttle valve.

If, under normal steady running operations, a change in engine speed occurs, an increment in the governor generator signal voltage will be produced. The generator voltage is fed into a speed-determining circuit where the increment causes an unbalance in a speed circuit bridge. The bridge unbalance is then fed into an electronic selector which decides whether a speed control or temperature control circuit will be used. For small speed changes, the speed selector places the speed circuit in control. The signal is then amplified by the D. C. voltage amplifier and, together with various derivatives and integrals required for stability, is fed into the proportional solenoid of the pilot valve. The proportional solenoid constitutes a solenoid type motor capable of delivering a linear motion proportional to its input voltage and as applied to the present invention it effects a deflection of the pilot valve piston through a distance proportional to the signal voltage and permits a high pressure to act selectively upon the top or the bottom of the throttle valve metering piston whereby an engine speed correction will be produced. When the engine speed returns to normal, the speed bridge is balanced, the solenoid current has decreased to zero, the solenoid has returned to neutral, and the throttle valve piston will remain in a fixed position.

Should a speed change result in a tail-pipe temperature above that allowable for acceleration, the temperature bridge of the governor will become unbalanced in the direction which places the temperature circuit in control. The current flowing to the electronic selector will be amplified by the D. C. voltage amplifier, and by the same sequence as described above with respect to operation during a normal steady running, the fuel flow to the engine will be controlled so as to maintain the indicated tail-pipe temperature in the engine.

Referring now to the drawings, the details of the structural improvements characterizing the present invention may be described. A fuel control device is indicated generally by the reference numeral 15 and includes in integral assembly therewith a throttle valve 16, a pilot valve 17, a speed-sensing device (not shown) and a relief valve 19.

The pilot valve 17 of the present invention is shown as including a piston 43 having a plurality of spaced metering lands along its length which is generally vertically disposed so as to be cooperatively associated with an actuating mechanism such as a proportional solenoid indicated generally by the reference numeral 44.

The piston 43 is reciprocable within a rotatable sleeve 45 which is of generally cylindrical configuration and is suitably ported to establish a cooperative metering relationship with the metering lands provided on the piston 43. An additional bearing sleeve 46 of larger diameter than the rotatable sleeve 45 is carried by a pilot valve casing 17a and journals the rotatable sleeve 45 therein.

The rotatable sleeve 45 is driven through a clutch assembly including a generally cylindrical clutch element 47 having a radially extending flange portion 47a at one end thereof. The clutch element 47 is provided with a partially threaded center bore and may be firmly assembled in threaded relationship with a reduced diameter portion of the rotatable sleeve 45. The tube-like end portion of the clutch element 47 surrounds a portion of the rotatable sleeve 45 and lies in proximate abutting relationship to a radially flanged shoulder formed on the bearing sleeve 46.

A coiled clutch spring 48 is provided to surround the lower portion of the rotatable sleeve 45 and resiliently bias the gear 36 into driving relationship with the clutch face presented thereto by the radial flange portion 47a of the clutch element 47. A generally cylindrical spring retainer 49 having an enlarged collar portion on one end thereof abutting the bearing sleeve 46 effectively positions the spring 48 in biasing position relative to the gear 36 and the clutch element 47.

Slotted apertures may be provided in an intermediate portion of the clutch element 47 and the lowermost reduced diameter end portion of the rotatable sleeve 45 may be provided with slots so that a locking key 51 may be assembled in cooperative relationship with the sleeve 45 and the clutch element 47 to more securely link the two for co-rotation one with the other. A sleeve-type plug 52 may also be provided and may be inserted within the bore defined by the rotatable sleeve 45 adjacent the end thereof so as to seal the end of rotating sleeve 45 and thus cause the pressure reference at the bottom of piston 43 to be obtained from passage 71d.

The pilot valve piston 43 is initially loaded by a spring mechanism which comprises a specific feature of this invention. As may be seen on Figures 1, 4 and 11, an adjusting sleeve 52 having an internally threaded bore assembly on an intermediately threaded portion of the pilot valve piston 43 carries in integral assembly therewith a spring dividing washer 53. A pair of springs including a right hand spring 54 and a left hand spring 55 are placed in axial alignment on opposite sides of the spring dividing washer 53 in surrounding relationship to the pilot valve piston 43 and within the confines of a spring retainer 56 adapted to be supported within a hollow spring compartment defined by an upper portion of the pilot valve casing 17a.

Referring particularly to Figure 2, it will be noted that the reversely turned springs 54 and 55 are provided with suitable holding washers indicated at 57 and 58 respectively. The spring holding washers 57 and 58 are provided with diametrically opposed lugs 57a and 58a which are adapted to lockingly seat within appropriate radially spaced slots formed in the spring retainer 56, a cover element 59 (Fig. 4) and the spring dividing washer 53. It will be noted that by virtue of the provision of the slotted spring dividing washer 53 between the spring holding washers 57 and 58, the ends of the springs 54 and 55 are effectively tied together, thereby preventing repositioning of the springs. This feature, of course, tends to reduce the possibilities of resultant repositioning of the pilot valve due to repositioning of the springs.

It will also be apparent that the location of the novel spring attachment as above described places the springs below the proportional solenoid 44 in such a manner as to substantially decrease the distance between the effective point of attachment of the springs to the pilot valve piston 43 and the metering lands on the pilot valve piston 43. This feature is particularly significant in that it contributes to the reduction of the detrimental effects which are likely to follow as a result of differential expansion and contraction between components of the pilot valve assembly.

The use of reversely turned loading springs also prevents axial movement of the pilot valve piston 43 in case of twisting thereof because of a binding action with the rotatable sleeve 45.

The present invention further contemplates the provision of a filter in the inlet leading to the pilot valve 17. Referring particularly to Figure 4, it will be noted that a substantially circular flanged boss may be provided on one side of the pilot valve 17 which is externally threaded to receive in firm assembly therewith a cap 17b. The cap 17b is appropriately recessed near its end portion to seat an O ring 61 adjacent the end thereof whereby a sealed inlet chamber may be provided inside of the cap 17b and flange structure associated therewith.

A conventional filter structure may be firmly positioned against the pilot valve body by the cap 17b such filter being identified generally by the reference numeral 62. The filter 62 is adapted to screen the flow of fluid passing from the inlet chamber in the cap 17b and passing into an inlet passageway 63 which extends radially inward towards the center of the pilot valve 17.

It will be noted that the rotatable sleeve 45 is provided with a series of axially spaced annular grooves on the peripheral surface thereof. It is also provided with diametral apertures identified by the reference numerals 64 and 65, respectively, which are arranged to lie in planar registry with suitable apertures 66 and 67 formed in the bearing sleeve 46. The apertures 66 and 67 in the bearing sleeve 46 are, in turn, arranged to lie in registry with suitable outlet passageways 68 and 69 extending radially outward through the body 17a of the pilot valve 17 toward the throttle valve 16.

Additional annular grooves on the rotatable sleeve 45 are identified by the reference numerals 71a, 71b, 71c and 71d. It will be noted that each of the grooves 71a,

*b*, *c* and *d* are provided with suitable passageways whereby communication may be established between the grooves and the center bore extending through the rotatable sleeve 45.

The spaced metering lands provided on the pilot valve piston 43 are so located as to lie in proximate relationship to the various annular grooves formed on the rotatable sleeve 45. It will be noted, however, that two of the metering lands, shown in this particular embodiment as being of relatively narrow width and identified by the reference characters 43*a* and 43*b*, are arranged in such a manner as to effect a fluid flow controlling relationship with the apertures 64 and 65 and hence the apertures 66 and 67 leading to the outlet passageways 68 and 69.

It will be apparent, therefore, that when translating movement of the armature within the proportional solenoid 44 produces a plunger-like reciprocation of the pilot valve piston 43 against the bias of the springs 54 and 55 in response to a resultant signal transmitted to the proportional solenoid 44 by the electronic control device associated with the fuel flow control unit 15, the fluid entering the inlet chamber within the cap 17*b* will pass through the filter 62 and into the inlet passageway 63 after which it will be effectively metered and selectively introduced into either of the outlet passageways 68 and 69 depending on the respective relative vertical positioning of the pilot valve piston 43 within the rotatable sleeve 45.

The fluid passing through the pilot valve 17 and operating as a servo fluid therein may conveniently comprise the fuel, the flow of which is being controlled by the unit 15. The inlet of the pilot valve 17 may be connected to the discharge side of a main fuel pump (not shown) so as to be subjected to a high pressure $P_a$.

Another of the features of the present invention lies in the provision of a pilot valve structure wherein all working parts may be surrounded by the fuel constituting the servo fluid in order that the components thereof may be kept at the same temperature. By so regulating the temperatures of the pilot valve components, repositioning of the pilot valve is substantially precluded because differential expansion or contraction of the pilot valve components is eliminated.

In order to accomplish this objective, the body 17*a* of the pilot valve 17 is provided with a vertical passageway 71 which connects the inlet passageway 63 with a gear and clutch chamber 17*c* defined by the lower portion of the body 17*a*. As is clearly shown, the body 17*a* is provided with a plurality of vertical passageways 72 which connect the gear and clutch chamber 17*c* with the hollow space surrounding the springs 54 and 55 in the upper portion of the body 17*a*. A casing 73 surrounds the proportioning solenoid 44 and the interior thereof is placed in communication with the hollow space surrounding the springs 54 and 55 by means of angularly inclined fluid passageways 74 which pass through the body 17*a* of the pilot valve 17. Thus it will be apparent that a portion of the fluid entering the inlet passageway 63 will pass downwardly through the passageway 71 into the chamber 17*c* and thence upwardly through the passageway 72 so as to completely surround the spring mechanism. The fluid will also enter the passageways 74 and pass into the casing structure 73 surrounding the proportional solenoid 44. The fluid may be vented to the outlet side of the relief valve 19 through a passage 70 formed in the body 17*a*. A restriction may be placed at 93 in passage 71 to limit the amount of servo fluid that is circulated to control the temperature of the pilot valve.

It will be noted that the throttle valve 16 is provided with a body 16*a* suitably drilled to provide a pair of passageways 75 and 76 which communicate with the outlet passageways 68 and 69, respectively, leading from the pilot valve 17. Thus, servo fluid emanating from the outlet passageways 68 and 69 of the pilot valve 17 may be conducted to hollow chambers 16*b* and 16*c* which are formed on opposite ends of the throttle valve body 16*a* and enclosed by a bottom cap structure 16*d* and a potentiometer drive housing 16*e* which is assembled on the top portion of the body 16*a*. It will be noted that O ring gaskets may be employed in connection with the cap 16*d* and the housing 16*e* so as to cooperate with the body 16*a* of the throttle valve 16 and seal the hollow chambers 16*b* and 16*c*.

The throttle valve 16 is adapted to meter the flow of fluid emanating from a main fuel pump (not shown) to the burning nozzles of the jet engine (not shown) with which the fuel control unit 15 is associated. To accomplish that end, the throttle valve 16 is provided with a throttle sleeve 77 which is loosely fitted within a centrally disposed bore defined by the body 16*a* and which is axially positioned therein by end caps 78*a* and 78*b*. The throttle sleeve 77 is fluid sealed at three places within the body 16*a* by means of O rings 79*a*, 79*b* and 79*c* which may be cooperatively seated in appropriate circular grooves cut in the body 16*a* of the throttle valve 16 to surround the throttle sleeve 77 at three predetermined axial locations.

It may be noted that the sleeve arrangement eliminates the differential expansion and contraction of the throttle sleeve and the throttle piston elements associated therewith, which action frequently occurs in the fuel flow control units heretofore provided which usually employed a throttle sleeve pressed directly into the throttle valve body.

A throttle sleeve 77 is provided having a fixed upper leakage land 77*a* and a fixed lower leakage land 77*b* spaced therefrom. Intermediate the spaced leakage lands 77*a* and 77*b* are provided a plurality of radially spaced inlet apertures 77*c* which are adapted to place the inlet chamber 82 in communication with the internal bore defined by the throttle sleeve 77. The throttle sleeve 77 further defines a pair of complexly shaped diametrically opposed outlet apertures 77*d* which are adapted to place the bore within the throttle sleeve 77 in communication with the outlet chamber 83.

A long piston 85 reciprocable within the throttle sleeve 77 and provided with spaced skirt portions 85*a* and 85*b* cooperable with the leakage lands 77*a* and 77*b* respectively operates to control the flow of fluid from the inlet chamber 82 through the inlet apertures 77*c* and out through the outlet apertures 77*d* into the outlet chamber 83.

It should be apparent from the foregoing description that the throttle valve piston 85 may be hydraulically balanced by the fluid acting on the ends of the piston 85 which are exposed to the pressures developed within the chambers 16*b* and 16*c*. It may be noted that for consistant action of the pilot valve 17, the leakage between the zones defined by the chambers 16*b* and 16*c* and the center zone lying between the spaced leakage lands 77*a* and 77*b* must be kept the same and equal at all positions of the throttle valve piston 85. By providing fixed leakage lands in the throttle sleeve 77 and employing a long piston 85, it is not necessary that the throttle sleeve be absolutely perfect and indeflectable since extremely favorable operating conditions may be produced merely by employing a piston which is non-deforming and which is constant in diameter, characteristics which may be satisfactorily approached by mass production methods.

In operation, a speed sensing device is employed to produce a speed term which may be introduced into the electronic control associated with the fuel flow control unit 15. The speed term may be combined with the speed term of the electronic control. Similarly, a temperature signal may be introduced to the electronic control. The speed and temperature signals are sent to the electronic selector, which chooses the signal required during the operation cycle, and a resulting signal is amplified and applied to the proportional solenoid 44. The rotation of the sleeve 45 in the pilot valve and the reciprocation of the pilot valve piston 43 in response to a translation produced by the proportional solenoid 44 permits a closely controlled metering action to occur between the relatively rotating slots or apertures 64 and 65 in the sleeve 45 and the metering lands 43a and 43b on the piston 43. The metered fluid will thus be selectively introduced into one or the other of the outlet passageways 68 or 69 and will thereby serve to control the position of hydraulically balanced piston 85 in the throttle valve 16.

The relief valve 19 will accept that portion of the fuel which is not required by the engine and return it to the main fuel pump in the inlet. At the same time, the relief valve 19 will maintain a fixed constant pressure drop across the throttle 17. Fluid emanating from the throttle valve may be subjected to further safety regulation by passing the fuel through appropriate overspeed devices and manually operated shut off stops as will be readily understood by those versed in the art. In any event, the fuel supply, as controlled by the throttle valve, is introduced into a flow divider after which the fuel is distributed to appropriate burners in the jet engine with which the fuel control unit 15 is associated.

It will be apparent from the aforegoing description that we have provided an improved fuel flow control unit for an electrically actuated fuel system of a turbo-jet engine which is characterized by the provision of novel components which are easier to produce and cheaper to manufacture but which operate with improved efficiency.

It will be further apparent that we have described a fuel flow control unit having a novel arrangement of components whereby the detrimental effects due to differential expansion and contraction of control unit elements as well as repositioning of valve components is substantially precluded.

It will be understood, of course, that a person skilled in the art might suggest various minor modifications to the structure herein described by way of preferred embodiment and illustrative example only, however, we do not intend to be limited to the precise details set out for the sake of clarity but wish to embrace within the scope of our invention all such modifications as reasonably and properly come within the purview of our contribution to the art.

We claim as our invention:

1. A pilot valve for controlling a hydraulically balanced throttle valve comprising, a body, a bearing sleeve therein, a rotatable sleeve journaled in said bearing sleeve, a metering piston reciprocable in said rotatable sleeve, means reciprocating said piston in response to predetermined signals, spring means normally biasing said piston toward a neutral position, said spring means including aligned oppositely coiled helical springs having adjoining ends thereof interconnected and non-rotatably connected with the piston and the opposite ends thereof connected to the body and piston respectively to substantially preclude repositioning of the springs and the piston, rotating means driving said rotatable sleeve, and including a clutch means having elements adapted to selectively engage said rotating means in driven connection therewith, said body and said bearing sleeve defining an inlet passageway and a pair of outlet passageways, said rotatable sleeve defining inlets through the bore thereof and a pair of spaced outlet apertures, said piston defining axially spaced metering lands adapted to cooperate with said pair of outlet passageways and said outlet apertures to selectively meter fluid into one of said outlet passageways in response to the axial positioning of the piston relative to the rotatable sleeve.

2. In a pilot valve, a spring biased reciprocable metering piston movable axially within a rotatable ported sleeve journalled in a valve body, a spring loading mechanism including an adjusting sleeve threadedly mounted on the metering piston, a spring dividing washer integrated with said adjusting sleeve, a pair of aligned springs each having an end abutting an opposite side of the spring dividing washer and the free ends thereof non-rotatably engaging fixed spring retaining means for holding the springs in the valve body, whereby said spring loading mechanism may be located at an intermediate portion of said metering piston proximate metering lands thereof.

3. In a pilot valve, a spring biased reciprocable metering piston movable axially within a rotatable ported sleeve journalled in a valve body, a spring loading mechanism including an adjusting sleeve threadedly mounted on the metering piston, a spring dividing washer integrated with said adjusting sleeve, a pair of aligned springs each abutting with one of its ends an opposite side of the spring dividing washer and fixed-spring retaining means for holding the springs in the valve body, whereby said spring loading mechanism may be located at an intermediate portion of said metering piston proximate metering lands thereof, said springs being reversely turned one from the other with the adjacent ends thereof effectively tied by said spring dividing washer, said reversely turned springs operative to prevent axial movement of the piston in case of twisting thereof.

4. In an electronically controlled fluid flow control unit, a pilot valve comprising, a body, a bearing sleeve therein, a rotatable sleeve journaled in said bearing sleeve, a metering piston reciprocable in said rotatable sleeve, electric motor means connected to one end of said piston for reciprocating said piston in response to predetermined electric signals, control spring means normally biasing said piston toward a neutral position, rotating means for said rotatable sleeve, and a clutch means associated with said rotatable sleeve having elements adapted to selectively engage said rotating means in driven connection therewith, said body and said bearing sleeve defining an inlet passage-way and a pair of outlet passage-ways, said rotatable sleeve defining an inlet through the bore thereof and a pair of spaced outlet apertures, said piston defining axially spaced metering lands adapted to cooperate with said pair of outlet passage-ways and said outlet apertures to selectively meter fluid into one of said outlet passage-ways in response to the axial positioning of the piston relative to the rotatable sleeve.

5. A pilot valve comprising a body having a pair of relatively movable nested valve parts, the inner of said parts being reciprocable, the outer of said parts being rotatable and having a plurality of ports communicable with each other in a predetermined paired relation, said inner part having metering lands thereon cooperating with said ports for establishing said paired relation, an extension formed on said inner part and extending axially thereof and biasing means mounted on said extension for normally biasing said inner part toward a neutral position, and including a pair of oppositely coiled helical springs surrounding said extension and having adjoining ends interconnected and non-rotatably connected to said inner part and said body to substantially preclude repositioning of the springs and said inner part, a rotatable driver for said outer part, and clutch means effecting a selective driven connection with said driver and said outer part, said clutch means including a spring biased clutch element threadedly connected to said outer part, said clutch element having a radially flanged clutch plate providing a friction area cooperable with said driver, and means for shifting said inner part away from said neutral position to adjust said metering lands with respect to said ports.

6. A pilot valve comprising a body having a pair of relatively movable nested valve parts, the inner part being reciprocable, the outer part being rotatable and having a plurality of ports communicable with each other in a predetermined paired relation, said inner part having metering lands thereon cooperating with said ports for establishing said paired relation, an extension formed on said inner part and extending axially thereof and biasing means mounted on said extension for normally biasing said inner part toward a neutral position and including a pair of oppositely coiled helical springs surrounding said extension and having adjoining ends interconnected and non-rotatably connected to said inner part of said body to substantially preclude repositioning of the springs and said inner part, and means for shifting said inner part away from said neutral position to adjust said metering lands with respect to said ports.

7. A pilot valve comprising a body having a pair of relatively movable nested valve parts, the inner part being reciprocable, the outer part being rotatable and having a plurality of ports communicable with each other in a predetermined paired relation, said inner part having metering lands thereon cooperating with said ports for establishing said paired relation, an extension formed on said inner part and extending axially thereof and biasing means mounted on said extension for normally biasing said inner part toward a neutral position and including a pair of oppositely coiled helical springs surrounding said extension and having adjoining ends interconnected and non-rotatably connected to said inner part and said body to substantially preclude repositioning of the springs and said inner part, a solenoid motor connected to said extension and circuit means connected to said motor to energize said motor in response to electric signals for shifting said inner part away from said neutral position to adjust said metering lands with respect to said ports.

8. A pilot valve comprising a body having a pair of relatively movable nested valve parts, the inner part being reciprocable, the outer part being rotatable and having a plurality of ports communicable with each other in a predetermined paired relation, said inner part having metering lands thereon cooperating with said ports for establishing said paired relation, an extension formed on said inner part and extending axially thereof and biasing means mounted on said extension for normally biasing said inner part toward a neutral position and including a pair of oppositely coiled helical springs surrounding said extension and having adjoining ends interconnected and non-rotatably connected to said inner part and said body to substantially preclude repositioning of the springs and said inner part, means for shifting said inner part away from said neutral position to adjust said metering lands with respect to said ports, a rotatable driver for said outer part, and clutch means effecting a selective driving connection with said driver and said outer part.

9. A pilot valve as defined in claim 6, a rotatable driver for said outer part, and clutch means effecting a selective driven connection with said driver and said outer part, said clutch means including a spring biased clutch element threadingly attached to said outer part, said clutch element having a radially flanged clutch plate providing a friction area cooperable with said driver.

10. A pilot valve as defined in claim 6, and means surrounding said inner and outer parts communicating with fluid flowing through said ports for circulating servo fluid around said parts to maintain a uniform temperature in all parts of said pilot valve.

11. A pilot valve as defined in claim 6, and rotating means having a driving connection with said outer part.

References Cited in the file of this patent

UNITED STATES PATENTS

| | | |
|---|---|---|
| 1,155,602 | Miles | Oct. 5, 1915 |
| 1,511,425 | Roucke | Oct. 14, 1924 |
| 1,604,776 | Hardinge | Oct. 26, 1926 |
| 2,019,766 | Peterson | Nov. 5, 1935 |
| 2,034,222 | Baker | Mar. 17, 1936 |
| 2,050,430 | Erickson | Aug. 11, 1936 |
| 2,050,750 | Drummond | Aug. 11, 1936 |
| 2,117,891 | Kalin | May 17, 1938 |
| 2,124,274 | Nichols | July 19, 1938 |
| 2,200,824 | Herman | May 14, 1940 |
| 2,207,921 | Huxford | July 16, 1940 |
| 2,217,880 | Woodson | Oct. 15, 1940 |
| 2,244,345 | Retschy | June 3, 1941 |
| 2,252,939 | McCoy | Aug. 19, 1941 |
| 2,262,173 | Fischer | Nov. 11, 1941 |
| 2,304,784 | Donaldson | Dec. 15, 1942 |
| 2,347,238 | Bennett | Apr. 25, 1944 |
| 2,411,930 | Mathys | Dec. 3, 1946 |
| 2,422,808 | Stokes | June 24, 1947 |
| 2,436,147 | Le Clair | Feb. 17, 1948 |
| 2,456,211 | Nordone | Dec. 14, 1948 |
| 2,470,382 | Vanni | May 17, 1949 |
| 2,474,018 | Sparrow | June 21, 1949 |
| 2,479,813 | Chamberlin | Aug. 23, 1949 |
| 2,482,254 | Fairchild | Sept. 20, 1949 |
| 2,488,221 | Moore | Nov. 15, 1949 |
| 2,489,871 | Edwards | Nov. 29, 1949 |
| 2,508,260 | Holley | May 16, 1950 |
| 2,566,051 | Avery | Aug. 28, 1951 |
| 2,573,724 | Neal | Nov. 6, 1951 |

FOREIGN PATENTS

| | | |
|---|---|---|
| 82,841 | Sweden | Mar. 12, 1935 |